June 14, 1966  R. J. FOREMAN ETAL  3,256,461
ELECTRONIC AUTOMOBILE ALARM CIRCUIT
Filed Feb. 4, 1964
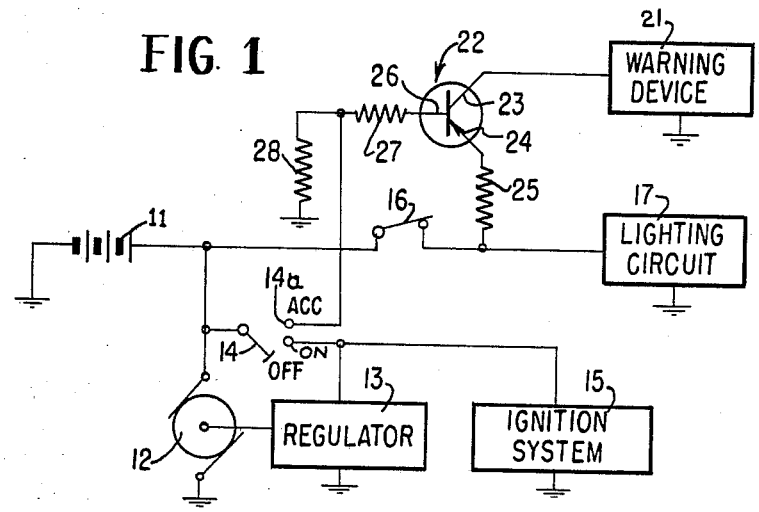
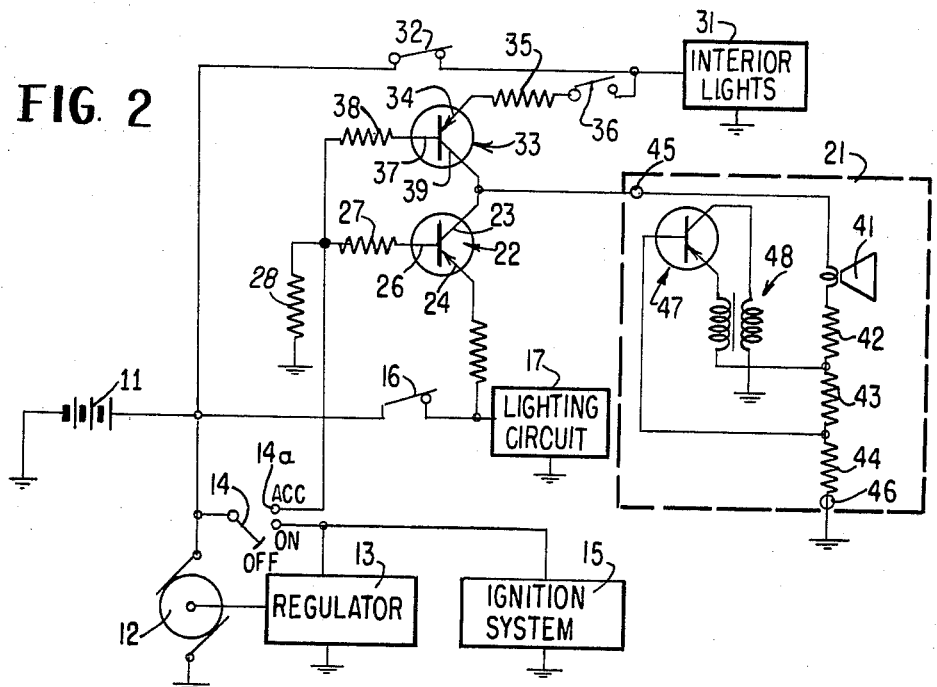
INVENTORS
Roland J. Foreman
BY Edward F. Guzick
Mueller & Aichele
Attys.

United States Patent Office 3,256,461
Patented June 14, 1966

3,256,461
ELECTRONIC AUTOMOBILE ALARM CIRCUIT
Roland J. Foreman, Franklin Park, and Edward F. Guzick, Northlake, Ill., assignors to Motorola, Inc., Franklin Park, Ill., a corporation of Illinois
Filed Feb. 4, 1964, Ser. No. 342,458
10 Claims. (Cl. 315—129)

This invention relates to alarm systems, and more particularly to an alarm system for use in an automobile to indicate when the lights are left on with the ignition switch turned off.

An unfortunate and all too frequent occurrence among automobile users is the failure to turn off the automobile lights when the car is parked. This can result in severe battery drain if the lights are left on for a long period of time. Although systems have been proposed for automatically turning off the lights, and/or for warning the driver when he leaves the car, these have not been found satisfactory and have not been used commercially.

It is therefore an object of this invention to provide a warning system for use in an automobile electrical system for providing an indication when the ignition switch is open and the light switch is closed.

Another object of the invention is to provide a warning system of the aforementioned character which may readily be installed in existing systems with a minimum amount of modification, and which is susceptible of expansion to provide warning indications of other conditions.

A feature of the invention is the provision, in an automobile electrical system, of a semiconductor switch for connecting a warning device to a source of potential through the light switch, and of a circuit for switching the semiconductor switch to conduction when the ignition switch is open and the light switch is closed.

Another feature of the invention is the provision, in an automobile electrical system having an ignition switch connecting an ignition system to a source of D.C. potential, and further having a light switch connecting a light circuit to the source of potential of a transistor with its emitter and collector electrodes coupled to drive a warning device, and with the emitter electrode coupled to the juncture between the light switch and the lights, and the base electrode coupled to the ignition switch and to ground.

In the drawings:

FIG. 1 is a schematic diagram of a circuit constructed in accordance with the invention; and, FIG. 2 is a schematic diagram of the circuit of FIG. 1 with additional circuitry providing an extra warning function, and with a particular form of warning device shown in detail.

The invention provides a warning system for use in an automobile electrical system having a source of D.C. potential. An ignition switch connects an ignition system to the source of potential, and a light switch connects a light circuit to the source of potential. The warning system includes a switch transistor, a control circuit and a warning device such as a tone oscillator, light or buzzer. The transistor is biased off when the ignition switch is on, and is biased on when the ignition system is turned off. The transistor connects the warning device for energization from the potential applied through the light switch to the light circuit. Accordingly, when the ignition switch is off the transistor is conducting, and if the light switch is on current is applied through the transistor to the warning device. This transistor, or a second transistor, can be rendered conducting when the ignition switch is open to apply current to the warning device from another circuit, such as the circuit for the interior lights of the automobile, which is energized when the door is opened. The warning device then operates when a door is opened if the ignition switch is open, to provide a burglar alarm.

Referring more particularly to FIG. 1, an automobile electrical system incorporating the invention is shown. A storage battery 11, has a charging circuit connected thereto comprised of generator or alternator 12, and regulators 13. A three position ignition switch 14 connects battery 11 with the ignition system 15. Battery 11 is also connected through a light switch 16 to a lighting circuit 17 for the head lights and tail lights of the automobile.

As may be seen, the lighting circuit and the ignition system are connected in parallel across the D.C. voltage source and are controlled by their respective switches, three position ignition switch 14 and light switch 16. This leads to the danger that when a driver parks his automobile and turns the ignition off by moving switch 14, to the position shown he may neglect to open switch 16 and extinguish the lights. The resultant drain on battery 11, if continued through a protracted period of time, could result in poor starting. Applicants' invention alleviates this danger by warning the drive either through a visual light indicator or by means of a small buzzer or tone oscillator, that he has neglected to open the light switch.

The warning device 21, which is energized to warn the driver of his failure to open switch 16, is energized from battery 11 through light switch 16, and through a transistor 22. The collector electrode 23 of transistor 22 is connected to warning device 21, and the emitter electrode 24 is connected through a current limiting resistor 25 to the juncture between light switch 16 and light circuit 17. The base 26 of transistor 22 is connected through a resistor 27 to the accessory contact 14a of ignition switch 14. A resistor 28 grounds accessory contact 14a. The described warning system may be easily added to existing electrical systems, as will be apparent to those skilled in the art. Connection might be made to the existing oil and/or generator warning lights used in many automobiles.

When switch 14 is on, both accessory contact 14a and ignition contact 14b are engaged. It will be seen that with switch 14 on and switch 16 closed, a positive potential will be placed on base 26 of transistor 22, cutting off the conduction therein. Warning device 21 will therefore be inoperative. If, however, switch 14 is opened while switch 16 remains closed, resistor 28 will forward bias transistor 22 into conduction to energize warning device 21. Opening switch 16 will cease conduction through transistor 22 and de-energize warning device 21. Accordingly, an indication is provided as to when ignition switch 14 is open, while light switch 16 remains closed. The third position of switch 14 makes contact only with contact 14a, the accessory contact. This permits energization of the lights with the ignition off without energizing the warning device.

Referring to FIG. 2, the automobile electrical system of FIG. 1 is shown with some additional circuitry. One of the additions provides a burglar alarm for the automobile which is responsive to the opening of the door. Here the automobile is provided with interior lights 31, which are energized upon closure of door switch 32. Switch 32 closes in response to opening of the door as is well known in the art. A transistor 33 has its emitter electrode 34 connected through a current limiting resistor 35 and an alarm set switch 36 to the juncture between door switch 32 and the interior light circuit 31. The base electrode 37 of transistor 33 is connected through current limiting resistor 38 to the accessory contact 14a of ignition switch 14. The collector electrode 39 of transistor 33, is connected to energize the warning device 21.

When the driver of the vehicle parks his car and leaves it, he may close switch 36, thereby setting the alarm. Upon the opening of a door of the automobile, switch 32 will also close. Since ignition switch 14 is open, transistor 33 will be forward biased and will conduct to energize warning device 21. If warning device 21 is sufficiently loud, enough attention will be attracted to the clandestine individual as to deter him from continuing his nefarious activities. Of course, other warning indications could be incorporated in the electrical system as described within the teaching of this invention.

Also shown in FIGURE 2 is a particular embodiment of the warning device 21. The device shown is an oscillator comprising transistor 47, transformer 48, and speaker 41, and resistors 42, 43 and 44 connected in series between input terminal 45 and ground terminal 46. Resistors 42, 43 and 44 form a voltage divider for biasing the transistor 47. Signals are fed back to transistor 47 by the connection through transformer 48. The result is that as long as current is flowing through resistor 43, forward biasing transistor 47, transistor 47 together with transformer 48 will produce oscillations which form signals for reproduction by speaker 41. This will provide an audible warning to the driver of the automobile that in the case of FIGURE 2, either he has left his lights on or an unauthorized entry of the automobile is taking place. Resistor 42 may be variable to adjust volume.

It may therefore be seen that the invention provides a warning system for use in an automobile electrical system for indicating when the ignition switch is open and the light switch is closed. In addition, the system may incorporate a burglar alarm or other similar warning system to provide further protection to the automobile owner. The circuitry is simple and reliable and may be easily added to an existing system. Satisfactory operation of the circuit shown in FIGURE 1 has been achieved by constructing a system wherein all resistors were ¼ watt, and all transistors were type 2N573 or equivalent. For positive ground electrical systems, NPN transistors could be used, connected as described above.

We claim:

1. An automobile electrical system having provision for indicating when the ignition switch is open and the light switch is closed, including in combination, an ignition system and an ignition switch for connecting the same to a source of direct current potential, a light circuit and a light switch for connnecting the same to the source of potential, a transistor having base, emitter and collector electrodes, a warning device connected to said collector electrode to be energized upon conduction of said transistor, first conductor means connecting said emitter electrode to the juncture between said light circuit and said light switch, resistance means for connecting said ignition switch to a reference potential, and second conductor means connecting said base electrode to means to apply cut off potential to said transistor when said ignition switch is closed, said resistance means forward biasing said transistor into conduction when said ignition switch is open and said light switch is closed, thereby energizing said warning device.

2. An automobile electrical system having provision for indicating when the ignition switch is open and the light switch is closed, and having further provision for an intruder alarm, said electrical system including in combination, an ignition system and an ignition switch for connecting the same to a source of direct current potential, a first light circuit and a first light switch for connecting the same to the source of potential, a second light circuit and a second light switch for connecting the same to the source of potential, said second light switch being responsive to the opening of a door of the automobile, first and second transistors each having base, emitter and collector electrodes, a warning device connected to said collector electrodes of both said first and second transistors to be energized upon conduction of either of said transistors, first conductor means connecting said emitter electrode of said first transistor to the juncture between said first light circuit and said first light switch, second conductor means connecting said emitter electrode of said second transistor to the juncture between said second light circuit and said second light switch, resistor means connecting said ignition switch to a reference potential, and third conductor means connecting said base electrodes of said first and second transistors to said resistor means to apply cut off potential thereto when said ignition switch is closed, said resistance means forward biasing respective ones of said transistors into conduction when said ignition switch is open and either of said first and second light switches is closed, thereby energizing said warning device.

3. A warning system for use in an automobile electrical system having an ignition switch connecting an ignition system to a source of direct current potential and further having a light switch connecting a light circuit to the source of potential, said warning system indicating when the ignition switch is open and the light switch is closed and including in combination, a warning device, a semiconductor switch for connecting said warning device to the juncture between the light circuit and light switch, said semiconductor switch having a control electrode responsive to a first potential applied thereto to hold said semiconductor switch open and prevent energization of said warning device, said semiconductor switch further being responsive to a second potential applied to said control electrode to close said semiconductor switch and energize said warning device, and a control circuit connected to said control electrode and including means for connection to the ignition switch for applying said first potential to said control electrode when the ignition switch is closed, said control circuit further including means for applying said second potential to said control electrode when the ignition switch is open.

4. A warning system for use in an automobile electrical system having an ignition switch connecting an ignition system to a source of potential and further having a light switch connecting a light circuit to the source of potential, said warning system indicating when the ignition switch is open and the light switch is closed and including in combination, a transistor having base, emitter and collector electrodes, a warning device connected to said collector electrode to be energized upon conduction of said transistor, first conductor means for connecting said emitter electrode to the juncture between the light circuit and the light switch, resistance means for connecting the ignition switch to a reference potential, and second resistance means for connecting said base electrode to said resistance means to apply cut off potential to said transistor when the ignition switch is closed, said resistance means forward biasing said transistor into conduction when the ignition switch is open and the light switch is closed, thereby energizing said warning device.

5. A warning system for use in an automobile electrical system having an ignition switch connecting an ignition system to a source of direct current potential and further having a light switch connecting a light circuit to the source of potential, said warning system indicating when the ignition switch is open and the light switch is closed and including in combination, a first transistor having base, emitter and collector electrodes, a warning device including a voltage divider network and an audio transducer connected in series with said collector electrode of said first transistor, said warning device further comprising a second transistor having a collector electrode and having base and emitter electrodes connected across a portion of said voltage divider network, a transformer coupling signals from said collector electrode of said second transistor to said emitter electrode of said second transistor to produce oscillations upon conduction of said first transistor, means for connecting said emitter electrode of said first transistor to the juncture between the light circuit and the light switch, resistance means for connecting the ignition switch to a reference potential, and means for connecting said base electrode of said first transistor across at least a portion of said resistance means to apply cut off potential to said transistor when the ignition switch is closed, said resistance means forward biasing said first transistor into conduction when the ignition switch is open and the light switch is closed, thereby energizing said warning device.

6. A warning system for use in an automobile having a speaker, an ignition switch connecting an ignition system to a source of potential, and a light switch connecting a light circuit to a source of potential, said warning system including in combination, transistor means having input, output and control electrodes, means for connecting said input electrode to the junction between the light switch and the light circuit, means for connecting said control electrode to the junction between the ignition switch and the ignition circuit to prevent conduction of said transistor means when the ignition switch is closed, resistor means for connecting said control electrode to the source of potential to complete a bias circuit for said transistor means and render said transistor means conductive when the ignition switch is open and the light switch is closed, a feedback transformer connected to said output electrode to provide oscillations at an audio frequency, and means for connecting said output electrode in a series circuit with the speaker to drive the speaker at the frequency of the oscillations when said transistor means is conductive, thereby providing an audible warning that the light switch is closed when the ignition switch is open.

7. A warning system for use in an automobile having a speaker, an ignition system and an ignition switch series connected across a source of potential, and a light circuit and a light switch series connected across a source of potential, said warning system including in combination, transistor means having first, second and third electrodes, said transistor means being responsive to a given polarity potential difference between said first and second electrodes to conduct and provide an output current at said third electrode, a bias circuit for connecting said first electrode to the junction between the ignition switch and the ignition system to apply potential to said first electrode when the ignition switch is closed, and for connecting said second electrode to the junction between the light switch and the light circuit to apply potential to said second electrode when the light switch is closed, said bias circuit applying a potential difference of the given polarity between said first and second electrodes when said ignition switch is open and said light switch is closed, a feedback transformer connected to said third electrode to provide oscillations at an audio frequency, and means for connecting said third electrode in a series circuit with the speaker to drive the speaker at the frequency of the oscillations when said transistor means are conductive, thereby providing an audible warning that the light switch is closed and the ignition switch is open.

8. A warning system for use in an automobile having a speaker, an ignition system and an ignition switch series connected across a source of potential, and a light circuit and a light switch series connected across a source of potential, said warning system including in combination, a transistor having base emitter and collector regions, means for connecting the speaker in series with the emitter to collector path of said transistor to energize said speaker in response to conduction of said transistor, a feedback transformer for providing oscillations at an audio frequency and having a primary winding connected in series with the emitter to collector path of said transistor, and control means connecting said transistor to the ignition switch and to the light switch, said control means having a pair of control conductors and being conductive in response to a potential difference of a given polarity between said control conductors, said control conductors being for respective connection to the junction between the light switch and the light circuit and the junction between the ignition switch and the ignition system, said conductors having a potential difference of the given polarity when the ignition switch is open and the light switch is closed to render said transistor conductive and produce an audible output in the speaker for warning.

9. A warning system for use in an automobile having a speaker, an ignition system including an ignition switch for applying operating potential thereto, and a light circuit including a light switch for applying operating potential thereto, said warning system including in combination, an oscillator circuit including a feedback transformer to produce oscillations at an audio frequency, a transistor having base, emitter, and collector electrodes, means connecting said speaker to said collector electrode, and a control circuit for connecting said base and emitter electrodes to the ignition switch and the light switch, said control circuit applying bias potential between said base and emitter electrodes when the ignition switch is open and the light switch is closed to bias said transistor into conduction, thereby producing an audible warning in the speaker.

10. A warning system for use in an automobile having a speaker, an ignition system and an ignition switch series connected across a source of potential, and a light circuit and a light switch series connected across a source of potential, said warning system including in combination, transistor means having first, second and third electrodes, with said first and second electrodes forming a conductive path responsive to current flow therethrough to render said transistor means conductive, means for connecting the conductive path formed by said first and second electrodes in series with the ignition switch across the source of potential to form a bias circuit for said transistor means conductive upon the passage of current through said bias circuit, means for connecting the junction between the ignition switch and the ignition system to the opposite side of said first and second electrodes from the light switch to shunt current from said conductive path when said ignition switch is closed, said bias circuit rendering said transistor means conductive when the ignition switch is open and the light switch is closed, a feedback transformer connected to said third electrode to provide oscillations at an audio frequency, and means for connecting said third electrode in a series circuit with the speaker to drive the speaker at the frequency of the oscillations when said transistor means is conductive, thereby providing an audible warning that the light switch is closed and the ignition switch is open.

No references cited.

JOHN W. HUCKERT, *Primary Examiner*.

D. O. KRAFT, *Assistant Examiner*.